United States Patent
Neumann et al.

(10) Patent No.: US 8,615,995 B2
(45) Date of Patent: Dec. 31, 2013

(54) COMPENSATION TANK FOR A HYDRAULIC MOTOR VEHICLE BRAKE SYSTEM

(75) Inventors: Hans-Jürgen Neumann, Rüsselsheim (DE); Peter Tandler, Kronberg/Ts. (DE); Stephan Schlicht, Nauheim (DE)

(73) Assignee: Continental Teves AG & Co. oHG (DE)

( * ) Notice: Subject to any disclaimer, the term of this patent is extended or adjusted under 35 U.S.C. 154(b) by 932 days.

(21) Appl. No.: 12/668,215

(22) PCT Filed: Aug. 7, 2008

(86) PCT No.: PCT/EP2008/060393
§ 371 (c)(1),
(2), (4) Date: Apr. 13, 2010

(87) PCT Pub. No.: WO2009/019302
PCT Pub. Date: Feb. 12, 2009

(65) Prior Publication Data
US 2010/0205957 A1    Aug. 19, 2010

(30) Foreign Application Priority Data
Aug. 7, 2007  (DE) .......................... 10 2007 037 225

(51) Int. Cl.
*B60T 11/26*   (2006.01)
(52) U.S. Cl.
USPC .................................. 60/584; 60/534; 60/453
(58) Field of Classification Search
USPC ............................. 60/453, 534, 584, 585, 592
See application file for complete search history.

(56) References Cited

U.S. PATENT DOCUMENTS

| 4,514,980 | A | * | 5/1985 | Ishiwata | 60/534 |
| 5,493,863 | A | * | 2/1996 | Yanagi et al. | 60/583 |
| 5,743,093 | A | * | 4/1998 | Nakayoku et al. | 60/585 |
| 6,984,000 | B2 | * | 1/2006 | Fraisse et al. | 60/585 |
| 7,448,211 | B2 | * | 11/2008 | Hayashi | 60/585 |

FOREIGN PATENT DOCUMENTS

| DE | 197 54 431 | | 6/1999 |
| DE | 603 00 848 | | 5/2006 |
| DE | 10 2005 048696 | | 4/2007 |
| DE | 102005048696 | A1 * | 4/2007 |
| EP | 141 09 68 | | 4/2004 |

OTHER PUBLICATIONS

International Search Report for PCT/EP2008/060393 dated Feb. 25, 2009.
German Search Report for DE 10 2007 037 225.8 dated Jun. 3, 2008.

* cited by examiner

*Primary Examiner* — Thomas E Lazo
(74) *Attorney, Agent, or Firm* — RatnerPrestia

(57) ABSTRACT

A fluid reservoir for a motor vehicle hydraulic brake system, having a housing with at least one fluid chamber, the housing preferably having a housing upper part and a housing lower part, a reservoir warning device for monitoring the reservoir filling level of the fluid reservoir, a filler neck for filling the fluid reservoir, a cap for fluid-tight closure of the filler neck, provisions for pressure balancing of the fluid reservoir and preferably a canister-shaped filling filter arranged in the area of the filler neck and having a wall and a base.

In order to provide a cost-effective and easily assembled fluid reservoir, the filling filter, which reliably prevents the ingress of dirt, extends into the fluid chamber and includes a wall molded onto the housing of the fluid reservoir that adjoins the reservoir filler neck.

23 Claims, 3 Drawing Sheets

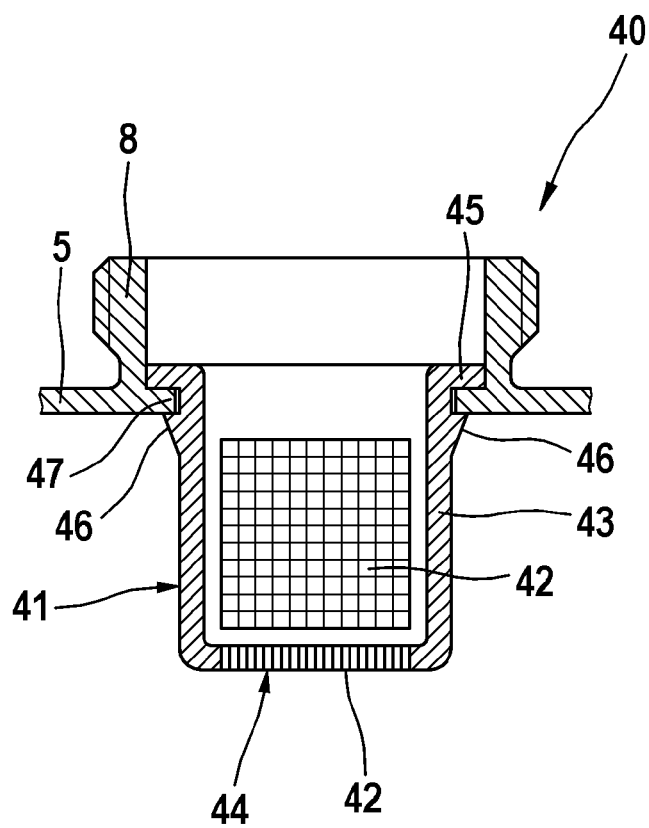
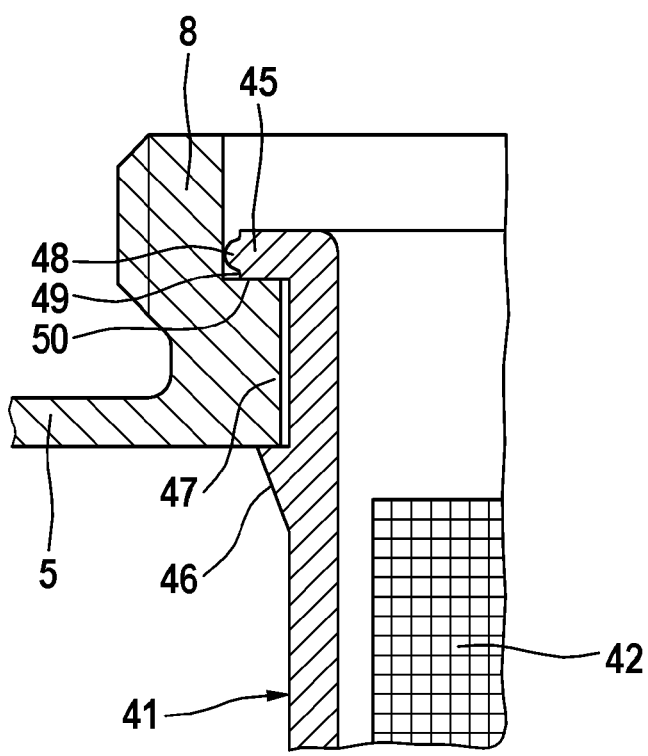

COMPENSATION TANK FOR A HYDRAULIC MOTOR VEHICLE BRAKE SYSTEM

CROSS-REFERENCE TO RELATED APPLICATIONS

This application is the U.S. national phase application of PCT International Application No. PCT/EP2008/060393, filed Aug. 7, 2008, which claims priority to German Patent Application No. DE 10 2007 037 225.8, filed Aug. 7, 2007, the contents of such applications being incorporated herein by reference.

FIELD OF THE INVENTION

The invention relates to a fluid reservoir for a motor vehicle hydraulic brake system.

BACKGROUND OF THE INVENTION

DE 197 54 431 A1, which is incorporated by reference, discloses a brake fluid reservoir having a filler neck protruding outwards from the housing and a strainer located in the filler neck. It is in the very nature of things that fine-meshed and correspondingly efficient strainers can decisively delay a fluid filling operation, so that without sanction these are often removed or left out. Safeguards are therefore proposed in order to prevent unsanctioned removal of the strainer. Other sources propose separate ventilation and venting apertures, which are intended to improve the rate of flow through the strainer. It is feasible, however, particularly in the case of very rapid and especially automated hydraulic filling operations, for the separate ventilation apertures to be inappropriately and inadmissibly used to bypass the strainer, so that unstrained fluid gets into the motor vehicle brake system.

One particular problem is that today's vehicle manufacturers want so-called vacuum filling on their assembly line. This high-vacuum filling requires an automatic filling unit having an adapter part which forms an airtight replacement for a pressure-balancing reservoir cap, a length of tube extending into the filler neck in order to create a vacuum throughout the entire brake system before fluid filling, and to automatically establish a defined fluid level in the brake system after fluid filling. This is basically achieved in that after the creation of a vacuum and the subsequent fluid filling (with an excess pressure of 1 bar, for example) and a further ensuing settlement phase any excess fluid is drawn off in order to establish a level. Removable filters are advantageous in order that the length of tube can be introduced into the reservoir to a sufficient depth even in the case of a small reservoir. Such filters have the associated disadvantage, however, that they can get lost or their fitting can be overlooked.

SUMMARY OF THE INVENTION

An object of the present invention is to propose a universal and yet cost-effective fluid reservoir which is easy to manufacture, which is unreservedly suited to rapid, even automated filling and which nevertheless reliably protects the brake system against any ingress of dirt, even when the filling process is greatly speeded up or is performed without standardized adapter parts.

A filler neck defines a buffer volume, in order to compensate for a possibly retarded flow through the filter. An integrated filter design means that the filter cannot readily be overlooked. A securely defined seating of the filter ensures that it is optimally matched to the automatic filling unit used. This means that the filter cannot be incorrectly fitted or overlooked.

In order to entirely eliminate the fitting of the filling filter, and hence an associated source of error, according to an advantageous embodiment of the invention the filling filter is of integral design.

In an especially preferred embodiment a filler neck is axially extended in the direction of the fluid chamber, the reservoir warning device being incorporated in the filler neck. This makes good use of the space available in the vehicle whilst at the same time preventing impurities adhering to the reservoir warning device from bypassing the filter and getting into the brake system. Furthermore the reservoir warning device does not get in the way when introducing the aforementioned length of tube of the automatic filling unit. One particular advantage is that sloshing around in the reservoir—which can trigger fault signals in conventional reservoirs—is damped by the action of the filter, so that the reservoir warning device in a way emits a smoothed signal.

Although the float described can in principle be fed through a contact carrier centrally arranged in the filler neck, the extended filler neck allows for separate or additional guidance of the float.

The filling filter is preferably formed from a material of the housing of the fluid reservoir, and is intended to be moulded onto the housing. The housing or the housing upper part and the filling filter can thereby be manufactured in one operation.

Any finishing work on the housing can be dispensed with in that the filling filter has filter apertures, which are produced during manufacture of the housing. The filter apertures are produced during manufacture of the housing by means of a special moulding die. The possibility of damage to the filter fabric—during fitting, for example—can thereby be entirely excluded. If the filter apertures are located in a wall of the filler neck both below and above a maximum fluid filling level, a hydraulic filter action is always obtained, and the pneumatic venting is at the same time led through the filter. In other words the filter cannot simply be bypassed with loss of the filter action.

In an alternative, advantageous embodiment the filling filter has filter elements with filter apertures which are injection-moulded into the wall and in the base of the filling filter. Expensive tooling costs are thereby avoided.

According to an advantageous embodiment of the invention filter apertures are provided in the wall and in the base of the filling filter. This ensures the exchange of air via the filling filter.

It is also possible, however, to provide filter apertures in the base of the filling filters and to endow the wall with at least one aperture for pressure balancing of the fluid reservoir. This embodiment also ensures an exchange of air via the filling filter.

In a further embodiment of the invention the wall of the filling filter is integrally formed with the housing and a filter element is attached as base to the wall. This makes the filter element easy and cost-effective to manufacture.

The filter element is preferably clipped into a circumferential internal groove of the wall, thereby facilitating the assembly process.

The filter element is especially cost-effective to manufacture if it is integrally produced in one piece from a plastic material.

According to the embodiments described above the wall of the filling filter may have either at least one fluid reservoir pressure-balancing aperture or filter apertures for the exchange of air via the filling filter.

According to a secondary aspect the object is achieved in that the filling filter is integrally formed in one piece and has filter apertures which are produced during manufacture of the filling filter, the filling filter having a circumferential collar, by means of which it can be inserted into the filler neck, and retaining means are moulded onto the wall which is integrally formed with the filling filter, securing the filling filter in the fluid reservoir, and which has filter apertures which are produced during manufacture of the filling filter. This makes the filling filter easy and cost-effective to manufacture and the possibility of damage to the filter fabric can be excluded. The positioning of the filling filter is furthermore secured by the retaining means.

Fitting of the filling filter is particularly rapid and easy if the retaining means are embodied as snap elements, which after inserting the filling filter into the fluid reservoir snap into place behind a collar of the filler neck.

A circumferential sealing bead, which affords a simple way of sealing the filling filter, is preferably provided on the circumferential collar of the filling filter.

In all the embodiments described above the filling filter may basically be provided in the form of a strainer.

For a good compromise between filter action under an accelerated passage of fluid and a good pneumatic venting effect, the sieve or mesh size of the filter is limited to the range between approximately 50 and 500 μm. A width of approximately 300 μm is preferably used.

BRIEF DESCRIPTION OF THE DRAWINGS

Further features, advantages and possible applications of the invention are set forth in the following description of exemplary embodiments and with reference to the drawing, which shows embodiments. The drawing in each case shows highly schematic and in part sectional representations, of which:

FIG. 4 shows a third exemplary embodiment of the fluid reservoir according to aspects of the invention in section and FIG. 5 shows a fourth exemplary embodiment of the fluid reservoir according to aspects of the invention in section.

DETAILED DESCRIPTION OF THE PREFERRED EMBODIMENTS

FIGS. 1 to 5 show exemplary embodiments of a fluid reservoir 1,20,40, according to the invention, the construction and function of which basically correspond to the construction and function of a known fluid reservoir.

Figure 1:
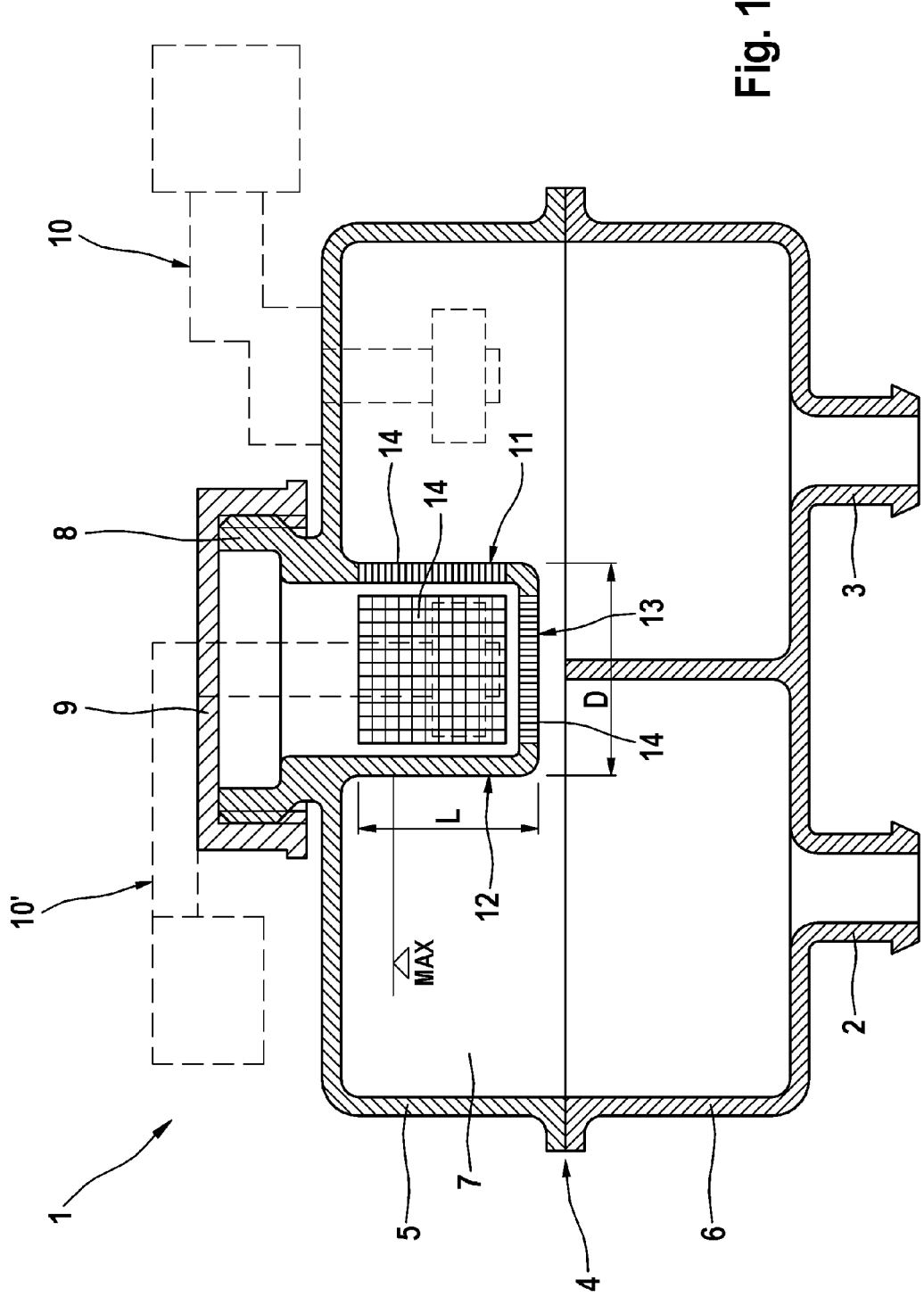
FIG. 1 shows a first exemplary embodiment of the fluid reservoir according to aspects of the invention in section.

As FIG. 1 shows, the fluid reservoir 1 is generally connected to a master cylinder (not shown) by way of reservoir connections 2,3 and fixed thereto. The fluid reservoir 1 has a housing 4 with at least one fluid chamber 7, the housing 4 comprising a housing upper part 5 and a housing lower part 6, which are welded together at their edges and partition walls (not shown).

For filling the fluid reservoir 1 a cylindrical filler neck 8 is provided, which projects at right-angles from an upper side of the housing upper part 5. A cap 9 serves for closing the filler neck 8. In order that fluctuating fluid levels do not initiate a pneumatic pressure build-up, means are provided for pressure balancing between a free fluid level of the fluid chamber 7 and an ambient atmosphere. This pressure balancing is achieved by an exchange of air, usually accomplished by suitable means in the cap 9. This ensures that an adapter part of an automatic filling unit can be fixed airtightly to the filler neck 8.

The fluid reservoir 1 further comprises a reservoir warning device 10,10' for monitoring the reservoir filling level of the fluid reservoir 1. For an optimized utilization of the space the reservoir warning device 10 is incorporated in the filler neck 8, extended in the direction of the fluid chamber 7, as is indicated only schematically. For this purpose the filler neck 8 is of somewhat larger dimensions than a float of the reservoir warning device 10, in such a way that the filler neck can basically fulfil a guide function for the displaceable float. The reservoir warning device 10,10' generally comprises a switch unit, with a contact carrier and a connector moulded onto the latter, and the float with a magnet arranged therein as magnetic pick-up, the float being arranged so that it is longitudinally displaceable on the contact carrier. Contact tabs and a reed contact as switch element are injection-moulded into the contact carrier or affixed to the latter.

In other embodiments of the fluid reservoir 1 the switch unit extends from a side wall into the pressure chambers, the magnetic pick-up being arranged above the switch unit.

An arrangement of the switch unit at the base of the fluid reservoir is also feasible.

As soon as the magnet passes a switching point of the reed contact due to a drop in the reservoir filling level, reeds of the reed switch close due to the magnetic field generated by the magnet, the magnetic attraction of the reeds exceeding the spring action of the individual reeds. The reed contact may be embodied as a closer or NO switch, in which the reeds are opened in the rest position. It is also possible, however, to use a reed contact embodied as an opener or NC switch, which in the resting state has closed reeds, which are opened under the influence of a magnetic force. The switching process generates a signal for an electronic switch unit of the motor vehicle brake system.

As is indicated, the reservoir warning device 10,10' may be arranged in the area of the cap 9 or in the area of the housing 4.

The fluid reservoir 1 further comprises a filling filter 11 integrally moulded onto the housing 4. The filling filter 11 is preferably located in the area of the extended filler neck 8, so that it separates removable components of the reservoir warning device 10,10' located in the filler neck 8 from the fluid chamber 7, and prevents any ingress of dirt into the fluid reservoir 1, particularly when topping up or refilling with fluid. The filling filter 11 comprises a wall 12—which is basically classed as part of the extended filler neck 8, together with a base 13.

As can be seen from FIG. 1, the wall 12 and the base 13 of the filling filter 11 are moulded onto the housing upper part 5 of the fluid reservoir 1 and the wall 12 adjoining the reservoir filler neck 8 extends into the fluid chamber 7. The possibility of an incorrect fitting of the filling filter 11 is thereby excluded.

During manufacture of the housing upper part 5 by a plastic injection-moulding process the filling filter 11 is integrally moulded onto the former. In the process, through a suitable design of the moulding die, filter apertures 14 having an average pore size of about 50 to 500 μm—a mean pore size of 300 μm is particularly preferred—are at the same time introduced into the wall 12 and the base 13. It can be seen from FIG. 1 that the area of the filter apertures 14 in the wall 12 extends beyond a MAX-mark of the fluid reservoir 1, which indicates the maximum filling level of the fluid reservoir 1. A ventilation function thereby always also ensues via the filling filter 11, so that filtering is always ensured, even at the maximum filling level and in the event of particularly rapid fluid filling.

It is equally feasible, however, to provide the filter apertures 14 just in the base area and to arrange apertures (not shown) in the wall 12 above the MAX-mark for pressure balancing.

Simultaneously producing the filter apertures 14 during manufacture of the housing upper part 5 makes it possible to dispense with finishing work on the housing upper part 5. The filter apertures 14 can be inspected by optical means in a subsequent function check.

A length L and a diameter D of the filling filter 11 can furthermore be defined, as required.

Without departing from the scope of the invention it is also feasible, as an alternative to the filter apertures 14 described, to injection-mould separate filter elements having filter apertures into the wall 12 and/or the base 13, thereby avoiding expensive special tooling.

Figure 2:
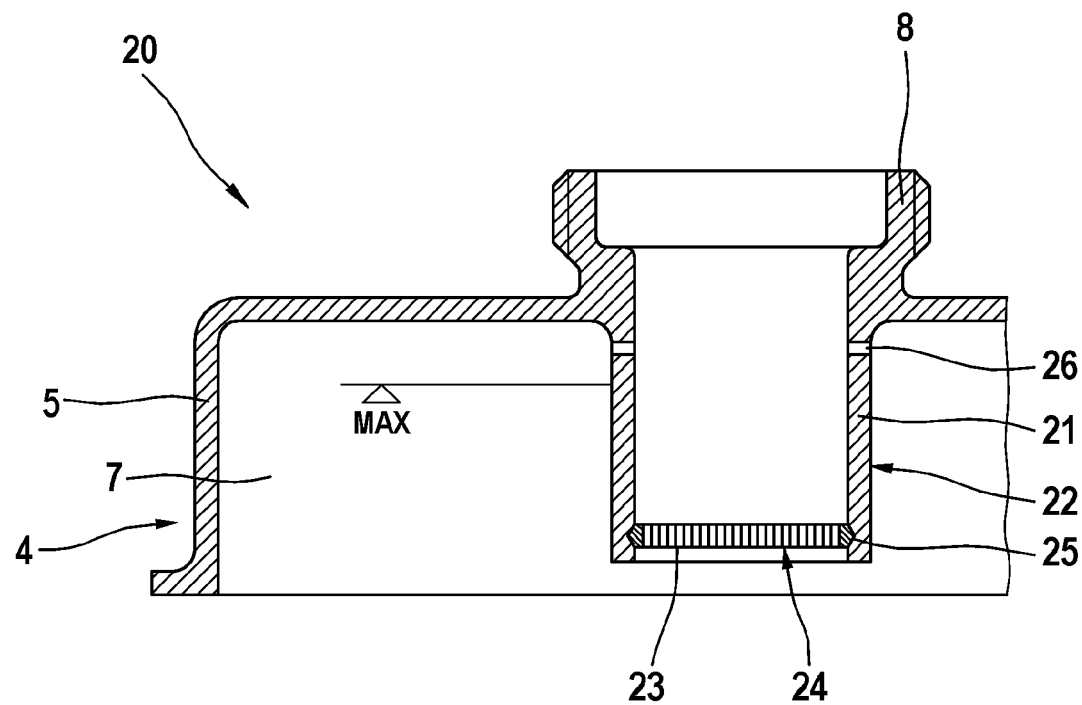
FIG. 2 a second exemplary embodiment of the fluid reservoir according to aspects of the invention in section.

FIG. 2 shows a second exemplary embodiment of the fluid reservoir 20. This and also a third exemplary embodiment represented in FIG. 4 differ from the first exemplary embodiment according to FIG. 1 merely in the design of the filling filters, so that the basic construction and function need not be described again. The same components are therefore provided with the same reference numerals.

In the second exemplary embodiment of the fluid reservoir 20 a wall 21 of a filling filter 22 is integrally formed with the housing 4 or the housing upper part 5 and a filter element 23 is attached as base 24 to the wall 21. The filter element 23 is thereby easy and cost-effective to manufacture.

It is possible, particularly if the reservoir warning device 10,10' is located next to the filler neck 8, to form the filling filter (11,22) basically as one continuous, perforated part of a wall of the housing upper part 5, the tubular extended filler neck 8 also being arranged on the housing upper part 5.

Figure 3A:
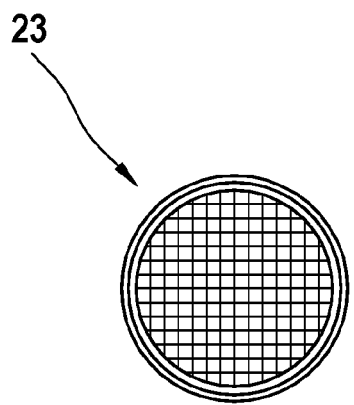
FIGS. 3a and 3b show filter elements for a fluid reservoir according to FIG. 2.
Figure 3B:
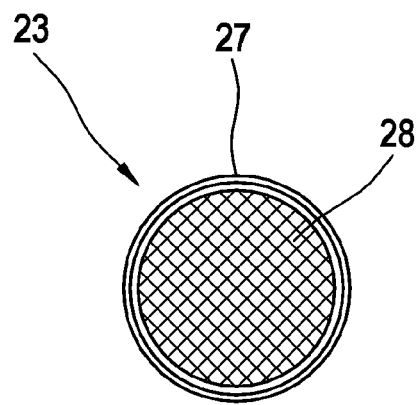

As can be seen from FIG. 2, the filter element 23 can easily be clipped into a circumferential internal groove 25 of the wall 21. It is feasible here, and particularly cost-effective, for the filter element 23 to be integrally manufactured from a plastic material, as shown in FIG. 3*a*. It is also possible here, however, to use known filter elements comprising a fabric 28 inserted into a housing 27, as shown in FIG. 3*b*.

In this exemplary embodiment too, the wall 21 of the filling filter 22 may have either one or more pressure balancing apertures 26 or a filter aperture for the exchange of air via the filling filter.

Other suitable methods of fixing for fastening the filter element 23 to the wall 21 are furthermore also possible without departing from the scope of the invention.

In a third and a fourth exemplary embodiment according to FIGS. 4 and 5 a filling filter 41 of the fluid reservoir 40 is integrally formed from a plastic material and has filter apertures 42 in a wall 43 and a base 44, which are produced during manufacture of the filling filter 41. The separate filling filter 41 is thereby easy and cost effective to manufacture. This embodiment also rules out the possibility of damage to the filter fabric.

For insertion into the filler neck 8 the filling filter 41 comprises a circumferential collar 45. For secured positioning of the filling filter 41 on an outside of the wall 43, retaining means in the form of snap elements 46 are furthermore moulded on, which secure the filling filter 41 in the fluid reservoir 40 by snapping in behind a collar 47 of the filler neck 8. Any ingress of dirt particles due to incorrect fitting of the filling filter 41 is therefore impossible and the filling filter 41 is particularly rapid and easy to fit.

The fourth exemplary embodiment according to FIG. 5 differs from the third exemplary embodiment particularly in that on the circumferential collar 45 of the filling filter 41 a radially outer circumferential seal is provided, for example in the form of a sealing lip or the sealing bead 48 shown, which for hydraulic sealing in a radial direction bears resiliently against a seat of a cylindrical inside wall of the filler neck 8. As shown, the seal is integrally moulded on an outside 49 of the collar 45 and may be formed from the material of the filler neck 8. This configuration has the advantage that a certain axially directed insertion or fitting movement of the filling filter 41 automatically produces a scraping or cleaning effect, that is say a self-cleaning action, in respect of the adjacent seal components. To enhance this effect the contour of the sealing bead is preferably of flattened or spherically rounded design. A further improved configuration comprises a sealing bead 48 which—in contrast to the material of the filler neck 8—is formed from an especially fatigue-resistant elastic material and is moulded on. A further advantage of the radial seal is that vibrations or shocks—such as always occur in motor vehicles—cannot cause a reduction of the sealing effect between the filling filter 41 and the filler neck 8.

It is also feasible in principle, however, to arrange the sealing bead 48 on an underside 50 of the collar 45, so that the sealing action operates in an axial direction. The sealing bead 48 permits easy and reliable sealing of the filling filter 41 in the area of the collar 45,47. This therefore ensures that even at this point no dirt particles can get into the fluid reservoir 40.

In order to improve the pressure balancing the seal described can furthermore be designed so that by advantageously incorporating at least one miniaturized duct, a perforation or a venting aperture a hydraulic seal is afforded at the same time as pneumatic permeability.

It is naturally feasible to reverse the design construction of the seal, as it were, by arranging the elastic seal described at the filler neck, in particular on its collar 47, without departing from the essence of the invention.

In principle the filling filter 11,22,41 may be embodied as a strainer in all the exemplary embodiments described above.

The invention claimed is:

1. Fluid reservoir for a motor vehicle hydraulic brake system comprising:
    a housing defining at least one fluid chamber,
    said housing having a housing upper part and a housing lower part, a reservoir warning device for monitoring a reservoir filling level of the fluid reservoir, a filler neck for filling the fluid reservoir, a cap for fluid-tight closure of the filler neck, means for pressure-balancing the fluid reservoir, and a filling filter,
    wherein the filling filter is integrally molded onto the housing of the fluid reservoir.

2. Fluid reservoir according to claim 1, wherein the reservoir warning device comprises a float that is incorporated in the filler neck.

3. Fluid reservoir according to claim 2, wherein the filler neck is extended in the direction of the fluid chamber for radial guidance of the float.

4. Fluid reservoir according to claim 1, wherein the filling filter extends into the fluid chamber and is arranged in an area of the filler neck and below the reservoir warning device, and wherein the filling filter adjoins the filler neck and is of a canister-shaped design having a side wall and a base wall.

5. Fluid reservoir according to claim 4, wherein the side wall of the filling filter has filter apertures, which are arranged both below and above a maximum admissible reservoir filling level.

6. Fluid reservoir according to claim 1, wherein the filling filter is integrally formed in one piece.

7. Fluid reservoir according to claim 1, wherein the filling filter is formed from a material of the housing of the fluid reservoir, and is molded onto the housing.

8. Fluid reservoir according to claim 1, wherein the filling filter has filter apertures with a mesh or pore width in a range from approximately ≥50 μm to approximately ≤500 μm.

9. Fluid reservoir according to claim 8, wherein the filling filter has filter apertures, which are produced during manufacture of the housing.

10. Fluid reservoir according to claim 8, wherein the filling filter has filter elements with filter apertures, which are injection-moulded in the base wall of the filling filter.

11. Fluid reservoir according to claim 8, wherein filter apertures are provided in the side wall and in the base wall of the filling filter.

12. Fluid reservoir according to claim 8, wherein filter apertures are provided in the base wall of the filling filter, and the side wall has at least one aperture for pressure-balancing of the fluid reservoir.

13. Fluid reservoir according to claim 4, wherein the side wall of the filling filter is integrally formed with the housing, and wherein a filter element is fixed to the side wall.

14. Fluid reservoir according to claim 13, wherein the filter element is clipped into a circumferential internal groove of the side wall.

15. Fluid reservoir according to claim 13, wherein the filter element is integrally formed from one plastic material.

16. Fluid reservoir according to claim 13, wherein the side wall has at least one aperture for pressure balancing of the fluid reservoir.

17. Fluid reservoir according to claim 13, wherein the side wall has filter apertures.

18. Fluid reservoir according to claim 1, wherein the filling filter is embodied as a strainer.

19. Fluid reservoir for a motor vehicle hydraulic brake system comprising:
   a housing defining at least one fluid chamber, the housing having a housing upper part and a housing lower part,
   a reservoir warning device for monitoring a reservoir filling level of the fluid reservoir,
   a filler neck for filling the fluid reservoir,
   a cap for fluid-tight closure of the filler neck,
   means for pressure balancing of the fluid reservoir,
   a canister-shaped filling filter arranged in an area of the filler neck and having a side wall and a base wall,
   wherein the filling filter is integrally formed in one piece and has filter apertures that are produced during manufacture of the filling filter,
   wherein the filling filter includes a circumferential collar that is configured for coupling to the filler neck, and retaining means on the side wall that secure the filling filter in the fluid reservoir.

20. Fluid reservoir according to claim 19, wherein the filling filter is formed from plastic.

21. Fluid reservoir according to claim 19, wherein the retaining means are embodied as snap elements, which, after insertion of the filling filter into the fluid reservoir, snap in behind a collar of the filler neck.

22. Fluid reservoir according to claim 19, wherein a circumferential sealing bead is provided on the circumferential collar of the filling filter.

23. Fluid reservoir according to claim 19, wherein the filling filter is embodied as a strainer.

* * * * *

UNITED STATES PATENT AND TRADEMARK OFFICE
CERTIFICATE OF CORRECTION

PATENT NO. : 8,615,995 B2
APPLICATION NO. : 12/668215
DATED : December 31, 2013
INVENTOR(S) : Neumann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 995 days.

Signed and Sealed this
Twenty-second Day of September, 2015

Michelle K. Lee
*Director of the United States Patent and Trademark Office*